United States Patent [19]
Taniguchi

[11] 3,877,177
[45] Apr. 15, 1975

[54] DEVICE FOR MACHINING SPHERICAL SURFACES
[75] Inventor: Tadasu Taniguchi, Tokyo, Japan
[73] Assignees: Canon Kabushiki Kaisha, Tokyo; Canon Denshi Kabushiki Kaisha, Chichibu-shi, Saitama-ken, both of Japan
[22] Filed: July 9, 1973
[21] Appl. No.: 377,256

[30] Foreign Application Priority Data
July 17, 1972  Japan................................ 47-71497

[52] U.S. Cl. ........................ 51/131; 51/55; 51/284
[51] Int. Cl. ............................................. B24b 13/00
[58] Field of Search ........................ 51/55, 131, 284

[56] References Cited
UNITED STATES PATENTS
2,005,718  6/1935  Desenberg ............................ 51/284
2,129,522  9/1938  Burroughs ............................. 51/131
2,836,939  6/1958  White ..................................... 51/131
2,982,057  5/1961  Stanhope ........................... 51/131 X FOREIGN PATENTS OR APPLICATIONS
552,316  6/1932  Germany .............................. 51/131

Primary Examiner—Al Lawrence Smith
Assistant Examiner—K. J. Ramsey
Attorney, Agent, or Firm—Fitzpatrick, Cella, Harper & Scinto

[57]  ABSTRACT

A device for machining spherical surfaces of a workpiece, such as a lens, which can evenly grind the surface to be treated by placing the surface of the workpiece in contact with a tool, such as an abrasive wheel, at a constant rate. The tool is inclined with respect to the workpiece to form an angle between the rotating shaft of the workpiece and the rotating shaft of the tool. Both the tool and the workpiece are designed to be moved on the intersection of the rotating shaft of the workpiece and the rotating shaft of the tool.

7 Claims, 9 Drawing Figures

PATENTED APR 1 5 1975

DEVICE FOR MACHINING SPHERICAL SURFACES

BACKGROUND OF THE INVENTION

1. Field of the Invention

The present invention relates to a device for machining spherical surfaces, whereby a spherical surface of a lens or the like is polished or ground, and more particularly to a device for machining spherical surfaces at a substantially constant rate of sliding contact speed between portions of the workpiece and the machining tool.

2. Description of the Prior Art

Workpieces such as lenses are generally machined by employing a process in which either lapping or an abrasive wheel is used. In the lapping process, suitable free grains (called a lap material, and including grinding A-grain and C-grain having a fine grain size, and chrome oxide, iron oxide, and the like are) mixed into oil and the like and are inserted between the tool called a lap and the surface to be finished of the workpiece, and the workpiece is pressed under a suitable pressure against the tool to effect a relative motion between the tool and the workpiece. In a process using an abrasive wheel, the grinding wheel is rotated so as to be place in sliding contact with the workpiece to effect a relative motion between the tool and the workpiece. Such a relative motion between the tool and the workpiece causes grinding of the surface of the workpiece to such an extent that an extremely fine amount of chips are shaved, thus providing a smooth finish of the surface of the workpiece.

To finish the workpiece in the form of a spherical surface by machining as described, the machining is generally performed in such a manner that the workpiece is attached to a main shaft to cause it to rotate and a tool such as an abrasive wheel is attached to a shaft to rotate it in a direction opposite to that of the main shaft, and the rotational speed of the two rotating shafts as described are each selected independently, without having any particular dependency upon each other, according to the sharpness of the abrasive wheel or for shortening the machining time.

Various prior art lapping machines for machining spherical surfaces are of the type in which a lap plate is put on the spherical surface to be machined of a rotating workpiece, said lap plate being rotatably carried by a rocking arm, and this arm is rocked to rotate the lap plate by virtue of the difference between the inner and the outer peripheral speeds of the workpiece while being rocked on the workpiece.

In those processes as described above, however, the sliding contact relative speed between the portion of the workpiece and the tool (or grinding grain) is not at a constant rate but differs according to the position of the workpiece, so that in the grinding process there is produced uneven finish roughness in some portions and in the lapping process an ideal spherical surface may not be obtained, being prone to produce defacement.

SUMMARY OF THE INVENTION

It is, therefore, an object of this invention to provide a device for machining spherical surfaces in which portions of the workpiece are evenly polished or ground.

It is a further object of this invention to provide a device for machining spherical surfaces wherein the sliding contact speed between portions of the workpiece and the tool is at a substantially constant rate.

It is another object of this invention to provide a device for machining spherical surfaces wherein said sliding contact speed can be made to have a substantially constant rate by an extremely simple construction.

It is yet another object of this invention to provide a device for machining spherical surfaces wherein said sliding contact speed can be made to have a substantially constant rate by merely controlling the angle formed between the workpiece holding shaft for holding and rotating the workpiece and the work holding shaft for holding and rotating the tool, and controlling the rotating speeds thereof.

Other objects and effects will appear more fully from the following description taken in connection with the accompanying drawings.

DESCRIPTION OF THE PREFERED EMBODIMENTS

Figure 1:
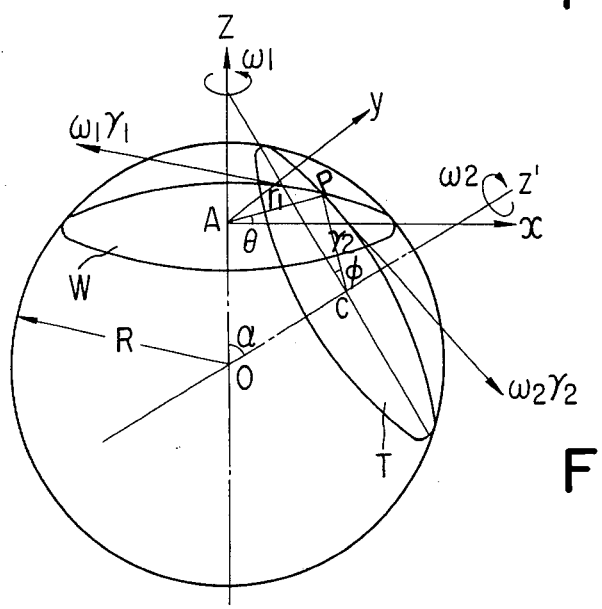
FIGS. 1 and 2 are diagrammatic illustrations showing the machining principle of the device for machining spherical surfaces according to the present invention.

Referring now to FIG. 1, a main axis Z, to which the workpiece is attached, rotates at an angular velocity $\omega_1$, while a tool axis Z' rotates at an angular velocity $\omega_2$ in a direction opposite to that of the main axis Z. These two axes are at an angle of $\alpha$ at a point 0. A machining tool is ring-shaped and the circumference of a circle T corresponds to a peripheral line depicted by a contact point between said tool and the workpiece. A circle W corresponds to a suitable section formed by cutting the workpiece perpendicular to the axis Z. Since the machining is carried out at the intersections between the circumference of the circle W and the circumference of the circle T, one of those intersections is represented at P. From the center A of the circle W, the axis $x$ is taken in the direction which intersects with axis Z' in the plane including said circle W, and the axis $y$ is taken in the direction at right angles to the axis $x$ in the same plane. Let $r_1$ represent the radius of the circle W and $r_2$ represent the radius of the circle T, then the peripheral speed of the workpiece at point P is $r_1\omega_1$ and the peripheral speed of the tool at said point is $r_2\omega_2$. Reference letter R indicates the radius of the spherical surface when the workpiece has a spherical surface, and let $\theta$ represent the angle formed between the segment of a line connecting the center A of the circle W with point P and the axis $x$, the segment connecting the center C of the circle T with point P representing the diameter of the circle T, and let $\phi$ represent the angle formed by the segment which intersects with the axis Z. In such a machining condition, relative velocities v of the workpiece and the abrasive wheel are obtained at an intersection P between the locus circumference of W in a certain point of the workpiece and the locus (circumference of T) in a certain point of the abrasive wheel, and the conditions are found so that said velocities are constant (that is, having nothing to do with $r_1$ and $\theta$) at every point of the workpiece.

The peripheral speeds $r_1\omega_1$ and $r_2\omega_2$ at point P between both circles W and T are given in the following Table 1 obtained by decomposing them in the directions of $x$, $y$, and $z$ axes.

Table 1

| Speed Component | Peripheral Speed of Circle W | Peripheral Speed of Ciecle T |
|---|---|---|
| $x$ axis direction | $-r_1\omega_1\sin\theta$ | $r_2\omega_2\sin\phi\cos\alpha$ |
| $y$ axis direction | $r_1\omega_1\cos\theta$ | $r_2\omega_2\cos\phi$ |
| $z$ axis direction | 0 | $-r_2\omega_2\sin\phi\sin\alpha$ |

When the relative velocity v is obtained from the foregoing relations we get $$v= \sqrt{(-r_1\omega_1\sin\theta-r_2\omega_2\sin\phi\cos\alpha)^2+(r_1\omega_1\cos\theta-r_2\omega_2\cos\phi)^2+r_2^2\omega_2^2\sin^2\alpha\sin^2\phi} \quad (1)$$

Figure 2:
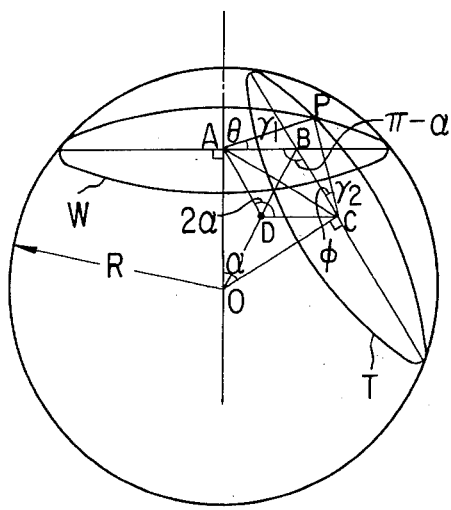

Then, other relative equations are deduced referring to FIG. 2 which is a detailed geometrical representation of FIG. 1. A quadrilateral A B C O having two right-angled apex angles is considered. Let D represent the center point of the segment OB, $<ADC=2\alpha$, and $<ABC=\pi-\alpha$. Hence, D is the center of a circumscribed circle of the quadrilateral A B C O. Hence, $$\overline{OD}=\overline{AD}=\overline{CD}=1/2\,\overline{OB}=1/2\,\sqrt{R^2-r_1^2\sin^2\theta} \quad (2)$$

When a cosine theorem is applied to $\triangle ADC$ and $\triangle ABC$,
$\overline{AC}^2=\overline{AD}^2+\overline{DC}^2-2\overline{AD}\cdot\overline{DC}\cos 2\alpha$
$\overline{AC}^2=\overline{AB}^2+\overline{BC}^2-2\overline{AB}\cdot\overline{BC}\cos(\pi-\alpha)$ When these are modified by applying them into Equation (2), we get
$\overline{AC}^2=(R^2-r_1^2\sin^2\theta)\sin^2\alpha$
$=r_1^2\cos^2\theta+r_2^2\cos^2\phi+2r_1r_2\cos\theta\cos\phi\cos\alpha \quad (3)$ Also, to PB, we get
$r_1\sin\theta=r_2\sin\phi \quad (4)$ If we eliminate $r_2$ and $\phi$ from Equations (1), (2) and (4), the following Equation (5) is finally obtained.

$$v= \sqrt{R^2(\omega_1^2+\omega_2^2+2\omega_1\omega_2\cos\alpha)-\{r_1\omega_2\cos\theta\lambda\sin\alpha\pm\sqrt{R^2-r_1^2}(\omega_1+\omega_2\cos\alpha)\}^2} \quad (5)$$

If $\omega_2 = -\dfrac{\omega_1}{\cos\alpha}$,

Equation (5) is converted into $$v = R\omega_1\tan\alpha\sqrt{1-\left(\dfrac{r_1\cos\theta}{R}\right)} \quad (6)$$

Variables $r_1$ and $\theta$ vary according to position on the axis Z in which an imaginary surface of the circle W in FIG. 1 is cut, and therefore the magnitude of the relative velocity v given in Equation (6) is not always constant at every point of the spherical surface. However, if the following two causes are taken into consideration, the velocity v can be regarded substantially constant.

A. In the case of $R>r_1$

The value in the square root in Equation (6) becomes almost equal to 1, being simplified as expressed by
$v \approx R\omega_1 \tan\alpha \quad (7)$ Closely inquiring into an error caused by $R>r_1$, $|\cos\theta| \leq 1$, and supposing that $|\cos\theta| = 1$ as a greatest value thereof is employed, the degree of Equation (7( displaced from v in Equation (6) is given in Table 2.

Table 2

| Relation between $r_1$ and R | Displacement of Equation (7) From Equation (6) |
|---|---|
| $r_1 = 0.1$ R | 0.5 % |
| $r_1 = 0.2$ R | 2 % |
| $r_1 = 0.3$ R | 4.5 % |
| $r_1 = 0.4$ R | 8.5 % |
| $r_1 = 0.5$ R | 13.5 % |
| $r_1 = 0.6$ R | 20 % |

The greatest values in error obtained by employment of Equation (7) in the form of approximate values in replacement of Equation (6) are as given in the above table by percentage.

The value of v becomes smaller by such value.

The value of v becomes smaller by such value. However, considering that the difference in speed of the order of ± 10 percent in machining is allowed in many cases, and if the relation between $r_1$ and R is within the order of $r_1 \leq 0.2$ R in the strict sense and is within the order of $r_1 = 0.5$ R~0.6 R in the easier sense, the machining by the process with the rotation of the tool axis set in the same direction as that of the workpiece axis and with the number of revolutions set to $1/\cos\alpha$ may be practically applied without difficulty. The embodiment for this process will be described hereinafter.

B. In case of $\cos\theta \cong 0$, that is, $\theta \cong \pi/2$

The value of the square root in Equation (6) becomes almost equal to 1, being expressed by Equation (7') below.
$v \cong R\omega_1\tan\alpha \quad (7')$ Closely inquiring into an error caused by $\theta=\pi/2$ ($=90°$), and even supposing that the relation between R and $r_1$ is $R=r_1$, which is the worst case, the degree of Equation (7') displaced from v in Equation (6) is given in Table 3.

Table 3

| $\theta$ | Displacement of Equation (7') From Equation (6) |
|---|---|
| $\theta = 85°$ | 0.4 % |

Table 3-Continued

| $\theta$ | Displacement of Equation (7') From Equation (6) |
|---|---|
| $\theta = 80°$ | 1.5 % |
| $\theta = 75°$ | 3.4 % |
| $\theta = 70°$ | 6 % |
| $\theta = 65°$ | 9 % |
| $\theta = 60°$ | 13 % |
| $\theta = 55°$ | 18 % |

Considering that the difference in speed of the order of ± 10 percent in machining is allowed in many cases similar to the case (A) described above, the angle $\theta$ may be less than an angle of 90°, i.e. to the order of $\theta = 80°$ in the strict sense and to the order of $\theta = 55°$ in the easier sense. The machining by the process, with the rotation of the tool axis set in the same direction as that of the workpiece axis and with an angle between both axes set at the order of 90° – 55°, may be practically applied without difficulty. In the case (B), if an attempt is made to carry out machining of the surface, a small angle $\theta$ is produced, which is different from the case (A), so that only machining with a band form or machining with a web-like form with the angle $\theta$ deviated from $\theta = 90°$ toward the direction where the angle $\theta$ becomes smaller within the allowable range, may be effected using the tool. In practice, the tool can not be made as large in size as is desired in many cases, and as a result the process in accordance with the case (B) is often applied to the case having a relatively small radius R.

The machining process, in which cases (A) and (B) are embodied, will now be described in detail with reference to FIGS. 3 to 8.

Figure 3:
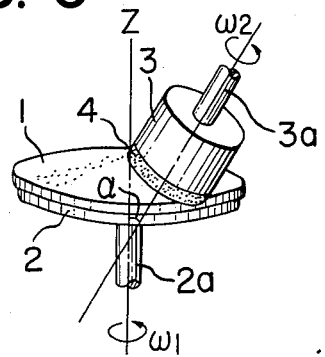
FIG. 3 is a perspective view illustrating a device according to the invention for machining spherical surfaces as applied to a workpiece having a convex spherical surface.
Figure 4:
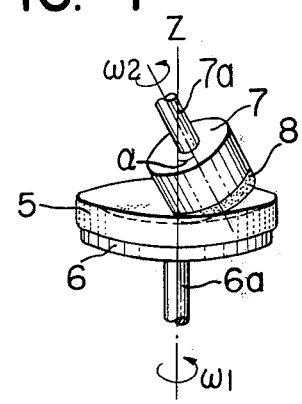
FIG. 4 is a perspective view illustrating a device according to the invention for machining spherical surfaces as applied to a workpiece having a concave spherical surface.
Figure 5:
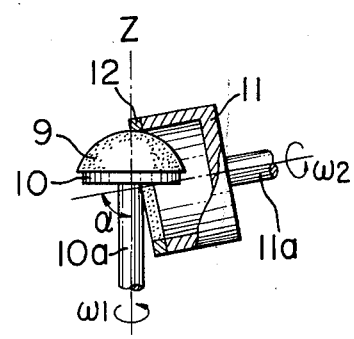
FIG. 5 is a perspective view illustrating a device according to the invention for machining spherical surfaces as applied to a workpiece having a convex spherical surface of relatively small spherical radius.
Figure 6:
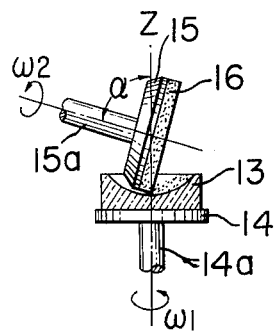
FIG. 6 is a perspective view illustrating a device according to the invention for machining spherical surfaces as applied to a workpiece having a concave spherical surface of relatively small spherical radius.

FIGS. 3 and 4 illustrate an embodiment according to case (A), while FIGS. 5 and 6 illustrate an embodiment according to case (B).

FIG. 3 illustrates an embodiment for machining a convex spherical surface, in which there is shown a workpiece 1 having a convex spherical surface, a workpiece holding plate 2 integrally coupled with a rotating shaft 2a and holding said workpiece, an abrasive wheel attachment 3 which carries an abrasive wheel portion and integrally rotates with a tool shaft 3a, and an abrasive wheel 4 attached thereto, the shape of which may be in the form of a ring or in a concave form fitted to the finish radius R of the workpiece. To grind the convex spherical surface of the workpiece with the construction as described above, the rotating shaft 2a of the workpiece is rotated at a desired angular velocity $\omega_1$ on the center axis Z of the workpiece, for example, as indicated by the arrow, and the tool shaft 3a is rotated in the same direction as that of the rotating shaft 2a of the workpiece with an angular velocity $\omega_2$ set to $\omega_1/\cos \alpha$. Reference letter $\alpha$ here indicates an angle formed between said rotating shafts. This machining process will hereinafter be described in further detail.

FIG. 4 illustrates an embodiment for machining a concave spherical surface, in which there is shown a workpiece 5 having the concave spherical surface, a workpiece holding plate 6 integrally coupled with a rotating shaft 6a and holding said workpiece having the concave spherical surface, an abrasive wheel attachment 7 which carries an abrasive wheel portion and integrally rotates with a tool shaft 7a, and an abrasive wheel 8 attached thereto, the shape of which may be in a form for grinding only the outer periphery thereof, such as a flat disc or ring, or in a convex form fitted to the finish radius R of the workpiece to carry out machining with the whole surface. To grind the concave spherical surface of the workpiece with the construction as described above, it may be carried out similarly to the case as previously described in connection with FIG. 3 according to the aforesaid process of (A) so that the description thereof is omitted.

In FIGS. 3 and 4, due to the forming characteristic of the grinding tool, the type of machining in which only the inner periphery or the outer periphery of said tool is used is suitable for grinding, and the type of machining in which the whole surface of the tool is used is suitable for lapping.

Both FIGS. 3 and 4 illustrate two modes of machining in connection with the workpiece and the tool in accordance with the aforesaid case (A), which embodiments fulfill $r_1 \leq 0.2R$ forming the relation between the radius of the spherical surface at the portion to be machined of the workpiece, that is, finish radius R and the radius $r_1$ of the circle (corresponding to the circle W in FIG. 1) whose center is the rotating axis Z of the workpiece at a point where the abrasive wheel for machining said spherical surface is in contact with the spherical surface to be machined. When the position of the circle T shown in FIG. 1 is moved in parallel toward the tool axis Z', point P which is an intersection with the circle is re-positioned on the circumference of the circle W to thereby vary the value of $\theta$. However, the relation of $R > r_1$ exists as previously described, so that the influence caused by the variation of said angle $\theta$ may be ignored, and therefore machining may be carried out with the tool surface having a shape formed along the peripheral surface of the sphere of radius R having point 0 as the center, instead of having the shape of said grinding tool made in the form of a ring.

This tool has its advantage in reducing the operating time because the area to be simultaneously machined increases more than in the case of said ring-like tool in view of the machining efficiency.

FIGS. 5 and 6 illustrate embodiments suitable for the case in which the radius R of the finished spherical surface of the workpiece is relatively small, and is particularly concerned with examples embodying the machining process in accordance with the aforesaid(B).

FIG. 5 illustrates an embodiment for machining a convex spherical surface, including a workpiece 9 having a convex spherical surface, a workpiece holding plate 10 integrally coupled with a rotating shaft 10a for holding said workpiece, an abrasive wheel attachment 11 which carries an abrasive wheel portion and integrally rotates with a tool shaft 11a, and an abrasive wheel 12 attached thereto, the shape of which being ring-like as shown in a cutaway view, and the radius of the inner diameter of the ring being formed slightly smaller than the finish radius R of the workpiece 9. To grind the convex spherical surface of the workpiece with the construction as described above, employing the aforesaid process of (B), the rotating shaft 10a of the workpiece is rotated at a desired angular velocity $\omega_1$ on the center axis Z of the workpiece, for example, as indicated by the arrow, and the tool shaft 11a is rotated in the same direction as that of the rotating shaft 10a of the workpiece with an angular velocity $\omega_2$ equal $\omega_1/\cos \alpha$. Reference letter $\alpha$ here indicates an angle formed between said both two rotating shafts. This process is different from the condition shown in FIGS. 3 and 4 as in case of machining the convex spherical surface as shown in FIG. 5, the angle $\alpha$ is set to a value close to about 90°, as shown, so that the cup-type attachment 11 provided with a ring-like abrasive wheel 12 is placed to deeply cover the workpiece 9. In this condition, said angle $\alpha$ inevitably approximates 90°, and the radius $r_2$ of a locus (corresponding to the circle T in FIG. 1) depicted by contact of the abrasive wheel 12 with the workpiece 9 is taken slightly smaller than the finish radius R of the workpiece.

FIG. 6 illustrates an embodiment for machining a concave spherical surface, including a workpiece 13 having the concave spherical surface, a workpiece holding bedplate 14 integrally coupled with a rotating shaft 14a for holding said workpiece, an abrasive wheel attachment 15 which carries an abrasive wheel portion and integrally rotates with a tool shaft 15a, and an abrasive wheel 16 attached thereto, the shape of which is in the form of a flat disc or ring. This embodiment deals with the concave spherical surface, which is different from the case shown in FIG. 5, but the workpiece and the tool are set similar to the former case. The radius of the outer diameter of the tool 15 is slightly smaller than the finish radius R of the workpiece, and the angle $\alpha$ formed between both rotating shafts is slightly smaller than 90°. For better understanding, the workpiece 13 is shown in section. The workpiece 13 and abrasive wheel 16 are rotated under rotating conditions similar to those described in connection with FIG. 5 so as to machine the concave spherical surface.

In performing linear or web-like machining by the use of a ring-like abrasive wheel in accordance with either of the foregoing (A) and (B) processes, the tool axis is swung so that the machining contour of the tool will not fail to pass the uppermost point (in the case of machining a convex spherical surface) of the workpiece or the lowermost point thereof (in the case of machining a concave spherical surface) to vary the angle of $\alpha$, thus preventing an unground portion from being left. That is, in the case of (A), the tool axis may also be swung on the intersection(corresponding to point 0 in FIG. 1) with the workpiece to increase the locus of the machining motion within the unit time for advancement of the machining efficiency. in the case of (B), linear machining is usually employed so that it is difficult to completely obtain the advantages as noted in (A) above. However in web-like machining, obtained with the angle $\theta$ varied from 90° within the range of allowance, the tool axis can be swung within such a range that the web is not displaced from the uppermost point or the lowermost point. In the case, however, when the cup-like abrasive wheel is formed to the shape corresponding to a finish surface of the workpiece without using the ring-like abrasive wheel, the tool axis is not required to be swung because the unground portions as described above are not left.

A more detailed mechanism embodying these machining processes will be hereinafter described.

Figure 7:
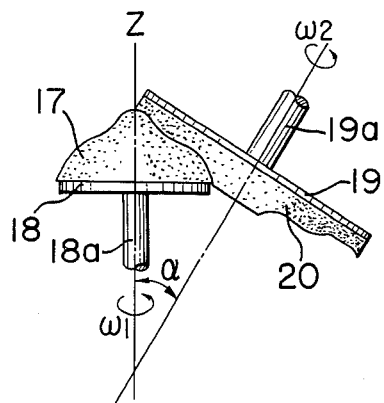
FIG. 7 is a perspective view illustrating a device according to the invention for machining spherical surfaces as applied to a workpiece comprising a non-spherical rotary body.

In the case of (A), if the shape of the tool is specifically formed equal to the shape of a finished surface of the workpiece so as not to vary the angle $\alpha$, each point on the workpiece is substantially subject to machining with a constant velocity and, therefore, there is less variation produced in shape of the grinding tool as the machining time goes by. If this is taken into consideration, the machining process according to (A) may also be utilized for grinding the non-spherical surface (rotary body on the axis). FIG. 7 illustrates an embodiment for such a case as just mentioned, and in the drawing, there is shown a workpiece 17 having such a non-spherical surface, a workpiece holding plate 18 integrally coupled with a rotating shaft 18a for holding said workpiece, an abrasive wheel attachment 19 which carries an abrasive wheel portion, and an abrasive wheel 20 attached thereto, the shape of which is formed to fit the shape of a finished surface of the workpiece 17. In machining, said workpiece 17 is placed in sliding contact with the attachment having an abrasive wheel 20, and they are rotated on their respective rotating axes at an angular velocity of $\omega_1$ and $\omega_2$, respectively as described in detail in connection with FIG. 3.

The construction and operation of mechanisms embodying the machining processes shown in FIGS. 3 to 7 will now be described with reference to FIGS. 8 and 9.

Figure 8:
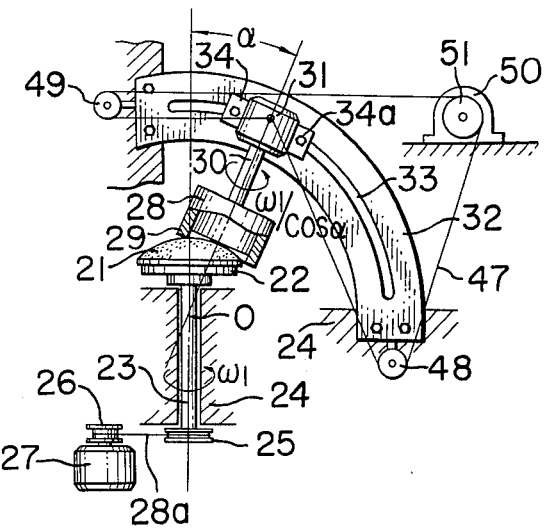
FIGS. 8 and 9 are front views illustrating main portions of the mechanisms of the devices according to the invention for machining spherical surfaces.

FIG. 8 is an illustration showing the main portion of the mechanism embodying the machining processes shown in FIG. 3, FIG. 5 or FIG. 7. In the drawing, there is shown a workpiece 21 having a convex spherical surface or a non-spherical surface to the machined, a workpiece holding plate 22 which holds the workpiece, and a rotating shaft 23 integrally coupled with said holding plate 22 for rotating the same, said shaft being rotatably mounted on the machine main body 24 by means of known bearings. There is shown a pulley as at 25, which is integrally mounted on said rotating shaft 21 and transmits, through a belt 28a connected between said pulley and a pulley 26 mounted on the rotating shaft of a motor 27, the torque of said motor to the rotating shaft 23. Thus, the workpiece 21 is rotated in the direction, for example, as indicated in the drawing, at an angular velocity $\omega_1$. The abrasive wheel attachment 28, adapted to carry an abrasive wheel portion 29, can be rotated integral with a tool shaft 30. The abrasive wheel 29 is in the form of ring. Reference numeral 31 indicates a variable speed motor which causes the tool shaft 30 to rotate in the direction as indicated by the arrow, that is, in the same direction as that of the rotating shaft 23 for the workpiece, at an angular velocity of $\omega_1/\cos\alpha$, and it may be adapted to transmit its torque to the tool shaft 30 through a reduction gear. There is shown an angle as at $\alpha$ which is formed between the rotating center axis of the rotating shaft 23 for the workpiece and the rotating center axis of the tool shaft 30. The motor 31 is supported by an adjusting means so as to be slidable arc-wise on the intersection 0 between both of said rotating center axes. This adjusting means comprises an adjusting plate 32 for the abrasive wheel attachment secured to the machining main body 24, an arc-like guiding slit 33 with a point 0 as its center made in said adjusting plate 32, and a supporting member 34 for the motor 31 having a shaft 34a slidably engaged with said guiding slit. With such a construction, the motor 31 enables the abrasive wheel shaft 30 to swing with respect to the rotating shaft 23 of the workpiece from the position where $\alpha$ is close to 0 to the position where $\alpha$ is close to 90° on the point 0 in an integral relation with the supporting member 34 along the guiding slit 33 made in the adjusting plate 32. Such a swinging motion may be produced by a drive means in which a string 47, fixed to a part of the motor 27, is connected by winding between pulleys 48 and 49 fixed to the adjusting plate 44 and is wound on a pulley 51 fixed to the motor 50 secured to the machine main body 24. Said motor 50 is preset so as to vary its rotating direction at regular intervals and to preset the number of revolutions, thereby enabling the abrasive wheel shaft 30 to swing with respect to the rotating shaft 23 of the workpiece. It should also be understood that the workpiece may be swung instead of swinging the abrasive wheel shaft as described above.

Figure 9:
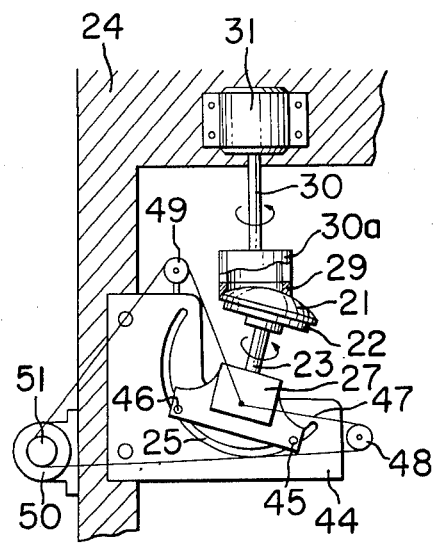

FIG. 9 illustrates a device for machining the spherical surfaces of the type in which the workpiece is swung as described, wherein the abrasive wheel attachment 30a, having the abrasive wheel portion 29 fixed is secured to the tool shaft 30, and which is driven by the motor 31 secured to the machine main body 24. Reference numeral 22 denotes a workpiece holding plate which holds the workpiece 21, said holding plate being secured to the motor 27 through the rotating shaft 23. This motor 27 is fixed slidably on the intersection of the rotating shafts 30 and 23 by means of pins 45 and 46 in an arc-like slit 25 made in the adjusting plate 44 fixed to the machine main body 24. In a manner similar to that shown in FIG. 8, the motor 27 is driven by a driving means which comprises pulleys 48, 49, and 51, a string 47, and a motor 50 for a swinging motion, to enable the rotating shaft 23 of the workpiece to swing with respect to the abrasive wheel shaft 30. With this construction as described, the machining processes shown in FIGS. 3, 5 and 7 may easily be accomplished by suitably selecting the shape of the abrasive wheels.

Although the device of the invention for machining a spherical surface has been described in its preferred form, it is understood that other forms, for example, a free grain lapping machine may be used by replacing said abrasive wheel with a lap disc, and further the detailed mechanisms based on the foregoing (A) and (B) are not limited to those shown in FIGS. 8 and 9 but changes may be made without departing from the spirit of the invention.

I claim:

1. A device for machining a spherical surface on a workpiece comprising, workpiece holding means for rotatably holding the workpiece, workpiece rotating means for causing said workpiece to rotate normally in a predetermined direction at a preset rotational speed, tool holding means for rotatably holding a tool adapted to grind the workpiece, the rotating axis of said tool being inclined relative to the rotating axis of said workpiece, and tool rotating means for causing said tool to rotate in the same direction as that of said workpiece and at a rotational speed obtained by multiplying the inverse of the cosine of an angle formed by said inclination between said rotating axis of said workpiece and said rotating axis of the tool by the rotational speed of the workpiece.

2. A device for machining spherical surfaces as claimed in claim 1 further comprising means for varying said angle formed between the rotating axis of said workpiece and the rotating axis of said tool.

3. A device for machining spherical surfaces as claimed in claim 1 further comprising means for moving said tool about the intersection of the rotating axis of said workpiece and the rotating axis of said tool.

4. A device for machining spherical surfaces as claimed in claim 1 further comprising means for moving said workpiece about the intersection of the rotating axis of said workpiece and the rotating axis of said tool.

5. A device for machining spherical surfaces as claimed in claim 1 further comprising means for setting said angle formed between the rotating axis of said workpiece and the rotating axis of said tool so that the distance from a position, in which said tool is in contact with said workpiece, to the rotating axis of said workpiece is within approximately 60 percent of the radius of the spherical surface for said workpiece.

6. A device for machining spherical surfaces as claimed in claim 1 further comprising means for setting said angle formed between the rotating axis of said workpiece and the rotating axis of said tool in the order between 90° and 55°.

7. A device for machining spherical surfaces as claimed in claim 6 wherein the radius of the spherical surface for said workpiece is larger than the radius of said tool.

* * * * *

UNITED STATES PATENT OFFICE
CERTIFICATE OF CORRECTION

Patent No. 3,877,177                          Dated  April 15, 1975

Inventor(s) TADASU TANIGUCHI

It is certified that error appears in the above-identified patent and that said Letters Patent are hereby corrected as shown below:

Column 1, line 26, "place" should read --placed--;

Column 3, line 27, "Ciecle" should read --Circle--;

Column 3, line 59, $$v=\sqrt{R^2(\omega_1^2+\omega_2^2+2\omega_1\omega_2\cos\alpha)-\left\{r_1\omega_2\cos\theta\lambda\sin\alpha\pm\sqrt{R^2-r_1^2}(\omega_1+\omega_2\cos\alpha)\right\}^2} \quad (5)$$

should read:

$$v=\sqrt{R^2(\omega_1^2+\omega_2^2+2\omega_1\omega_2\cos\alpha)-\left\{r_1\omega_2\cos\theta\sin\alpha\pm\sqrt{R^2-r_1^2}(\omega_1\omega_2\cos\alpha)\right\}^2} \quad (5)$$

Column 4, line 5, $$v = R\omega_1\tan\alpha\sqrt{1-\left(\frac{r_1\cos\theta}{R}\right)} \quad (6)$$

should read:

$$v = R\omega_1\tan\alpha\sqrt{1-\left(\frac{r_1\cos\theta}{R}\right)^2} \quad (6)$$

UNITED STATES PATENT OFFICE
CERTIFICATE OF CORRECTION

Patent No. 3,877,177            Dated April 15, 1975

Inventor(s) TADASU TANIGUCHI                    Page 2

It is certified that error appears in the above-identified patent and that said Letters Patent are hereby corrected as shown below:

Column 4, line 21, "(7(" should read --(7)--;

Column 5, line 6, "O" should read --$\Theta$--;

Column 6, line 46, "illustratea" should read --illustrates--;

Column 6, line 64, "$\omega_2$ equal" should read --$\omega_2$ set to equal--;

Column 7, line 45, "in" should read --In--;

Column 8, line 24, "to the machined" should read --to be machined--;

Column 8, line 39, "ring" should read --a ring--;

Signed and Sealed this twenty-fifth Day of November 1975

[SEAL]

Attest:

RUTH C. MASON
Attesting Officer

C. MARSHALL DANN
Commissioner of Patents and Trademarks